(12) United States Patent
Sedarat (10) Patent No.: US 8,611,451 B1
(45) Date of Patent: Dec. 17, 2013

(54) PRECODER COEFFICIENT OPTIMIZATION METHOD AND APPARATUS FOR COMMUNICATIONS SYSTEMS

(75) Inventor: Hossein Sedarat, San Jose, CA (US)

(73) Assignee: Aquantia Corporation, Milpitas, CA (US)

(*) Notice: Subject to any disclaimer, the term of this patent is extended or adjusted under 35 U.S.C. 154(b) by 0 days.

(21) Appl. No.: 13/409,061

(22) Filed: Feb. 29, 2012

Related U.S. Application Data (60) Provisional application No. 61/453,215, filed on Mar. 16, 2011.

(51) Int. Cl.
*H04B 7/02* (2006.01)

(52) U.S. Cl.
USPC ........... 375/267; 375/219; 375/220; 375/221; 375/222; 375/224; 375/226; 375/229; 375/230; 375/231; 375/232; 375/233; 375/295; 375/296; 375/299; 375/316; 375/347; 375/354; 375/355; 375/371; 455/39; 455/69; 455/101; 455/114.3; 455/130; 455/132; 455/500; 455/502; 455/516; 455/562.1; 370/272; 370/273; 370/276; 370/297; 370/334; 370/503; 370/516; 327/141; 327/163; 330/149

(58) Field of Classification Search
USPC ......... 375/219, 220, 221, 222, 224, 226, 229, 375/230, 231, 232, 233, 267, 295, 296, 299, 375/316, 347, 354, 355, 371; 455/39, 69, 455/101, 114.3, 130, 132, 500, 502, 516, 455/562.1; 370/272, 273, 276, 297, 334, 370/503, 516; 327/141, 163; 330/149
See application file for complete search history.

(56) References Cited

U.S. PATENT DOCUMENTS

| | | | |
|---|---|---|---|
| 6,934,345 B2 * | 8/2005 | Chu et al. | ...... 375/346 |
| 7,894,728 B1 * | 2/2011 | Sun et al. | ...... 398/208 |
| 8,340,171 B2 * | 12/2012 | Hovakimyan et al. | ...... 375/233 |

* cited by examiner

*Primary Examiner* — Leon Flores
(74) *Attorney, Agent, or Firm* — Mahamedi Paradice Kreisman LLP (57) ABSTRACT

A method of operation in a receive circuit is disclosed. The method comprises entering an initialization mode followed by receiving training data from a lossy signaling path. The training data originates from a transmit circuit. The received training data is sampled and minimax transmit equalizer coefficients are generated based on the sampled data. The minimax transmit equalizer coefficients are then transmitted back to the transmit circuit. The initialization mode is exited and an operating mode initiated, where transmit data precoded by the minimax transmit equalizer coefficients is received.

17 Claims, 8 Drawing Sheets

PRECODER COEFFICIENT OPTIMIZATION METHOD AND APPARATUS FOR COMMUNICATIONS SYSTEMS

RELATED APPLICATION(S)

This application claims benefit of priority to Provisional U.S. Patent Application No. 61/453,215, filed Mar. 16, 2011, the aforementioned priority application being hereby incorporated by reference in its entirety.

TECHNICAL FIELD

The disclosure herein relates to electronic communications, and more particularly to filtering data in electronic communications.

BACKGROUND

Gigabit Ethernet is an increasingly popular communication standard, with a nominal data rate of 10 Gbit/s. One form of 10 Gigabit Ethernet is IEEE 10GBASE-T, used to provide 10 gigabit per second connections over unshielded or shielded twisted pair copper wires. The wire-level modulation for 10GBASE-T is a Tomlinson-Harashima Precoded (THP) version of pulse-amplitude modulation with 16 discrete levels (PAM-16), encoded in a two-dimensional constellation pattern known as 128-DSQ (Double Square QAM).

Tomlinson-Harashima Precoding (THP) is a scheme in which the channel equalizer resides in the link transmitter, theoretically enabling the link receiver to see "perfect" symbols, as the transmit equalizer precompensates for impairments in the channel. The equalizer tap coefficients are generally calculated by the link partner receiver in accordance with, for example, a "Least Mean Squares" (LMS) algorithm during an initialization training period. The calculations made by the receiver theoretically provide an optimum set of coefficients that best characterize the inverse transform of the detected channel characteristics. Once the filter tap coefficients are calculated by the receiver, the values are communicated back to the transmitter and set until the next training sequence (which may never happen unless the link is intentionally broken). This set and forget methodology is mandated by the current 10GBASE-T Specification by IEEE 802.3an.

While the proposed 10GBASE-T transmission scheme works well for its intended applications, the fixed "set and forget" optimum THP coefficient generation scheme may be problematic in some circumstances. For example, in environmental conditions where heating variations occur, cable lengths may change by small amounts. Such small changes may potentially cause offsets to signal sampling phases that were calculated and optimized during initialization. Slight variations in sampling phase may have dramatic effects in signal-to-noise-ratio (SNR) due to aliasing effects in and around the Nyquist frequency (half the baudrate).

Accordingly, systems and methods are needed that provide the capability to generate THP coefficients that have improved robustness over a wider range of operating conditions.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3b illustrates a further embodiment of a CDR similar to FIG. 3a;

DETAILED DESCRIPTION

Embodiments of a THP coefficient generation method and circuit are disclosed. One embodiment of the method includes a method of operation in a receive circuit. The method comprises entering an initialization mode followed by receiving training data from a lossy signaling path. The training data originates from a link-partners' transmit circuit. The received training data is sampled and sub-optimal transmit equalizer coefficients are generated based on the sampled data. The sub-optimal transmit equalizer coefficients are then transmitted back to the transmit circuit. The initialization mode is exited and an operating mode initiated, where transmit data precoded by the sub-optimal transmit equalizer coefficients is received.

Figure 1:
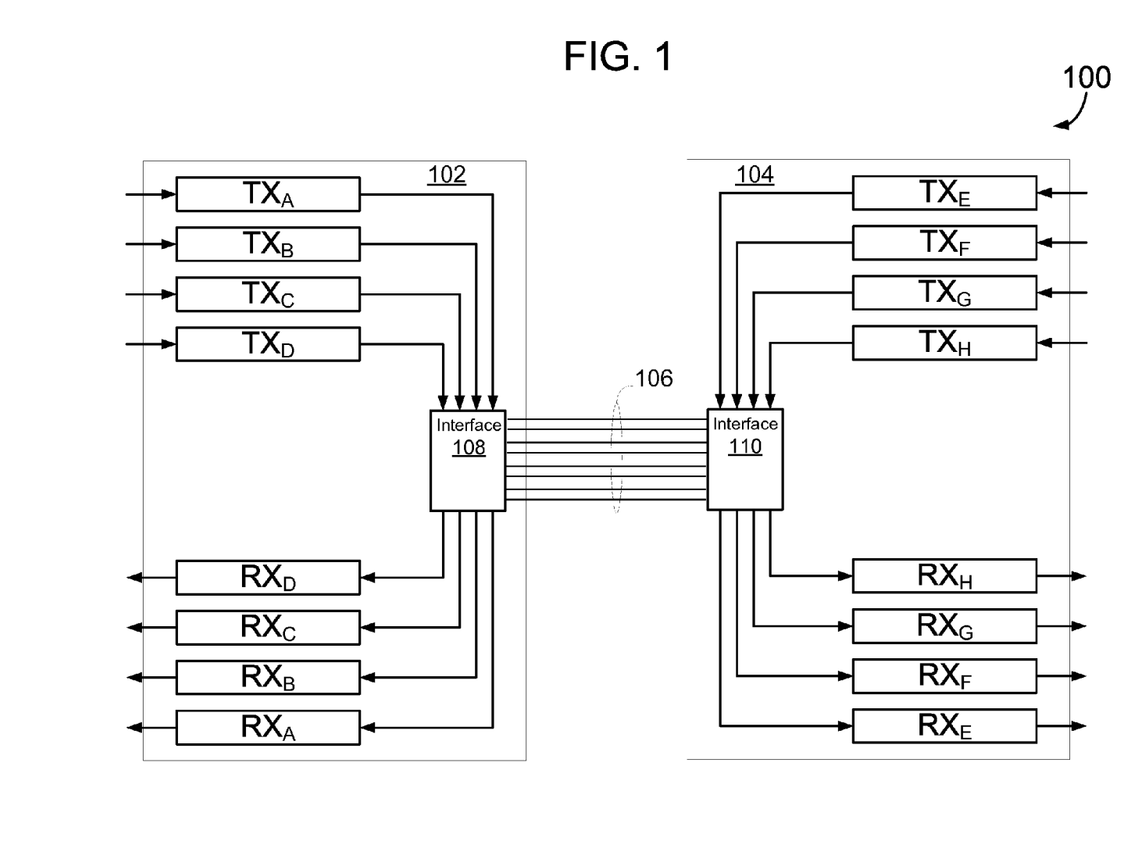
FIG. 1 illustrates a high-level transmitter/receiver channel architecture for the GBASE-T communication standard.

FIG. 1 is a block diagram illustrating one embodiment of a communication system 100. The system includes a first transceiver 102 and a second transceiver 104 that can communicate with each other. The first transceiver 102 includes "transceiver components" including one or more transmitters TXA-TXD and one or more receivers RXA-RXD. Similarly, the second transceiver 104 includes various transceiver components including one or more transmitters TXE-TXH and one or more receivers RXE-RXH. The transmitters TXA-TXH shown in FIG. 1 can be considered individual "transmitters," as typically referenced herein, or can be considered individual transmitter channels which a transmitter block within the transceiver can independently transmit signals on. Similarly, receivers RXA-RXH can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver that want to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver 102 can communicate with the second transceiver 104 over one or more communication channels of a communication link 106. In one embodiment, such as that corresponding to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver 102 and an interface 110 can be provided in the second transceiver 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

In one example from the point of view of the first transceiver 102, data transmissions during normal operation from a local transmitter TX are provided to the interface 108, which outputs the data on a corresponding channel of the communication link 106. The data is received by the link partner, the second transceiver 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Filters can be used to filter out this noise so that the receivers receive only data from other transceivers. In some embodiments, the transceivers 102 and 104 are asymmetric, such that data transmitted by a local transmitter has no dependence or relation with data being received by the corresponding local receiver.

Figure 2:
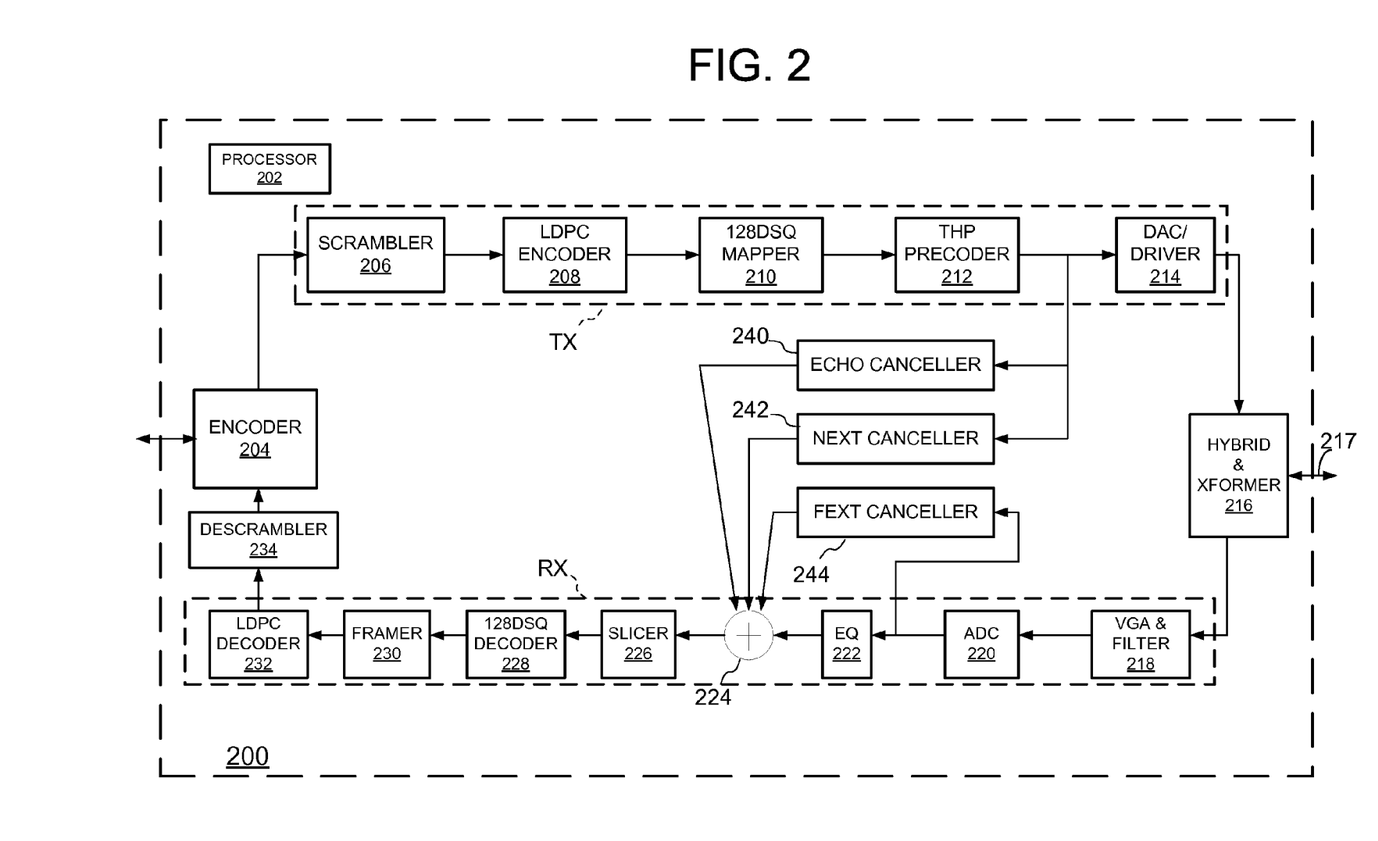
FIG. 2 illustrates one embodiment of a transceiver block diagram used in the architecture of FIG. 1.

FIG. 2 is a block diagram illustrating one example of a transceiver 200. This example is suitable for a 10GBASE-T standard, but other different configurations and types of transceiver components can be used in other embodiments for 10GBASE-T or for other, different communication standards. For explanatory purposes, the example shown in FIG. 2 illustrates a single transmitter path/channel and a single receiver path/channel for data. Multiple such paths/channels are provided in embodiments having multiple channels, e.g. four of the transmitter paths and the receiver data paths shown in FIG. 2 are used in the 10GBASE-T standard.

One or more processors 202 are typically included in transceiver 200, or connected to the transceiver, to control various operations for the transceiver components. Furthermore, additional hardware and/or software/firmware can be provided to implement the components themselves and can include processor functionality.

In the transmitter portion TX (denoted in phantom) of the transceiver 200, an encoder 204 can be used to encode data desired to be transmitted in a particular desired format or standard, followed by a scrambler 206 for self-synchronized scrambling of the data to be transmitted, providing clock transitions, a statistically random power spectrum for EMI (electromagnetic interference) control, equalizer convergence, etc. A low density parity check (LDPC) encoder 208 encodes the data according to the parity check for error correction. A 128DSQ mapper 210 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 212 can then adjust the signal to assist the far-end receiver in performing signal equalization. Further details regarding THP precoding are discussed below. An analog front end (AFE) for the transmitter can include a digital-to-analog converter (DAC) and driver block 214 which converts the data to analog form for transmission and transmits the data via the hybrid coupler and transformer block 216 to the channel 217.

Different embodiments can implement the hybrid and transformer block 217 differently. For example, in some embodiments the transformers may be separately connected directly to the communication link, and the hybrid coupler is connected between the transformers and the rest of the transceiver components. Other embodiments may provide transformers between hybrid and the other transceiver components, or another configuration.

In a receiver portion RX (in phantom) of the transceiver 200, data is received at the hybrid coupler 216. Four data communication channels are used in a 10GBASE-T embodiment (other amounts of channels can be used in other embodiments), and are sent to an analog front end (AFE) for the receiver which can include a variable gain amplifier (VGA) and filter 218 for filtering, and an analog-to-digital converter (A/D) 220. An equalizer block 222 can include one or more equalizers to remove inter-symbol interference (ISI). The output of the equalizer block 222 is summed with the outputs of filters 240, 242, and 244 at adder 224, and the output of the adder can be provided to a slicer 226 which can provide an average noise level in the received signal. The signal can then be provided to a DSQ128 decoder 228, which outputs decoded data to a framer 230 that extracts frames from the received data and provides the frames to an LDPC decoder 232 which error-corrects the data. The data can then be provided to a descrambler 234 which outputs de-scrambled data to the encoder 264 for provision to a connected computer system, processor, or other device.

The filters 240, 242 and 244 are used to reduce echo and crosstalk (NEXT and FEXT) noise which may be introduced in the transmission and reception of data over one or more of the four communication channels. Filters can include an Echo canceller 240, a Near End Crosstalk (NEXT) canceller 242, and a Far End Crosstalk (FEXT) canceller 244. The filters cancel out the effect of signal echo and crosstalk from adjacent lines to achieve an acceptable bit error rate. The output of the THP precoder 212 in the transmitter portion of the transceiver 200 is provided to the Echo canceller 240 and the NEXT canceller 242, which calculate the values for cancellation of echo and NEXT and output these values to the adder 224. Similarly, the output of ADC 220 is provided to the FEXT canceller 244, which calculates the values for cancellation of FEXT and outputs the values to the adder 224. The digital values of echo and crosstalk calculated by the filter are subtracted from the incoming noisy analog data (digitized by ADC 220) by adder 224 to provide received data on each channel with reduced noise.

Figure 3A:
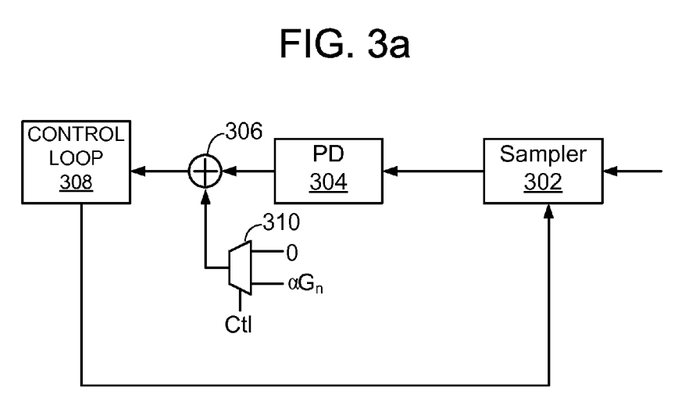
FIG. 3a illustrates one embodiment of a clock and data recovery (CDR) loop for use in the transceiver architecture of FIG. 2.

FIG. 3a illustrates one embodiment of a clock and data recovery circuit for use in the ADC 220 of FIG. 2. Although the ADC generally converts analog input data to digital output data, the sampling phase of the ADC may have a significant impact on the bit error rate. The circuit includes a sampler 302 to generate digital samples from input analog signals. The sampler takes its samples in accordance with a sampling phase that specifies the sampling instants for taking the samples. Generated samples are fed to a phase detector 304 for comparison against a reference clock. The output of the phase detector generally represents an error in phase which is used to make adjustments via a control loop 308 back to the sampler 302. To augment the phase error generation, a summing circuit 306 is employed to provide a node for combining the phase error signal with a further signal representing a sampling offset that is proportional to a Nyquist gain condition as more fully specified below.

Figure 3B:
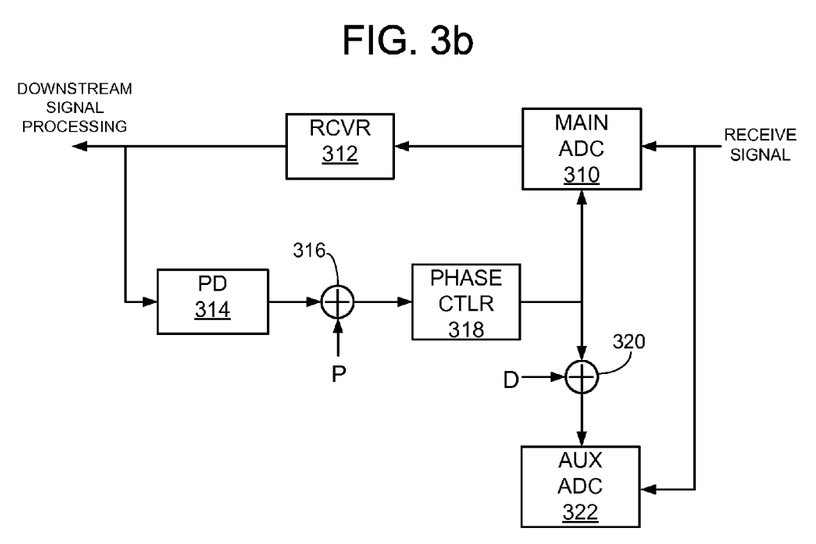

FIG. 3b illustrates a further embodiment of a CDR loop that is similar to that shown in FIG. 3a and described above. The loop includes a main ADC 310 that receives an analog input signal. An auxiliary ADC 322 also receives the signal to carry out further processing as more fully described below. The ADC passes a digitally converted version of the receive signal to a receiver 312 where the signal is exposed to adaptive equalization circuitry. The output of the receiver is then passed to various downstream signal processing circuitry (not shown). The digital output from the receiver is also fed back to a phase detector 314, where it is compared to a reference phase (not shown), and a phase error value generated and applied to a summer 316. The summer also receives an additional offset "P" that represents a value that is proportional to the Nyquist gain that corresponds to the sampling phase of the auxiliary ADC 322. The resulting aggregated phase offset value from the summer is directed to a phase controller 318 that applies the sampling phase to the main ADC 310 and a second summer 320. The second summer includes an input for a 180 phase offset value "D" that represents a 180 degree phase offset with respect to the main ADC. This closed phase recovery loop ensures that the input to the phase controller 318 is always forced to zero. Since the receiver 312 consists of an adaptive feed-forward equalizer, the output of the phase detector 314 converges to zero. Therefore, to force the input to the phase controller to zero, the closed phase controller loop has to shift the sampling phase such that P, the Nyquist gain for the auxiliary ADC, is also zero.

Further referring to FIG. 3b, the resulting loop operates to adaptively drive the sampling phase error value to a value where the Nyquist gain is minimized. This corresponds to a worst-case sampling phase for the auxiliary ADC 322. However, since a 180 degree phase offset is applied to the second summer 320, the main ADC 310 is "forced" to a sampling phase 180 offset from the worst-case phase, thus the optimal sampling phase.

Alternatively, the sampling phase offset "D" may be set to a small value, typically less than 90 degrees. In this scenario, the Nyquist-based offset "P" is set to a value that is proportional to the difference between the Nyquist gains of the main and auxiliary ADCs. Thus, "P" approximates the derivative of the Nyquist gain. With the receiver equalizers adapting during operation, the output of the phase detector 314 in the CDR loop is zero. As a result, the control loop drives the value of "P" to zero. Since the derivative of the Nyquist gain at the optimal sampling phase is zero, this control loop will converge the sampling phase to its optimal value. Note that the auxiliary ADC 322 is only used to find the Nyquist gain at a phase offset compared to the main sampling phase. Since the data from the auxiliary ADC is not used in other aspects of the receiver, the requirement on this ADC may be much more relaxed than the main ADC. For instance, the auxiliary ADC may have a fewer number of bits, or less linearity, etc. Since the changes in sampling phase during normal operation are slow, this auxiliary ADC may also be turned on for short intervals of time to estimate the Nyquist gain periodically. Therefore, the auxiliary ADC may be much simpler than the main one with much lower power consumption.

Figure 4:
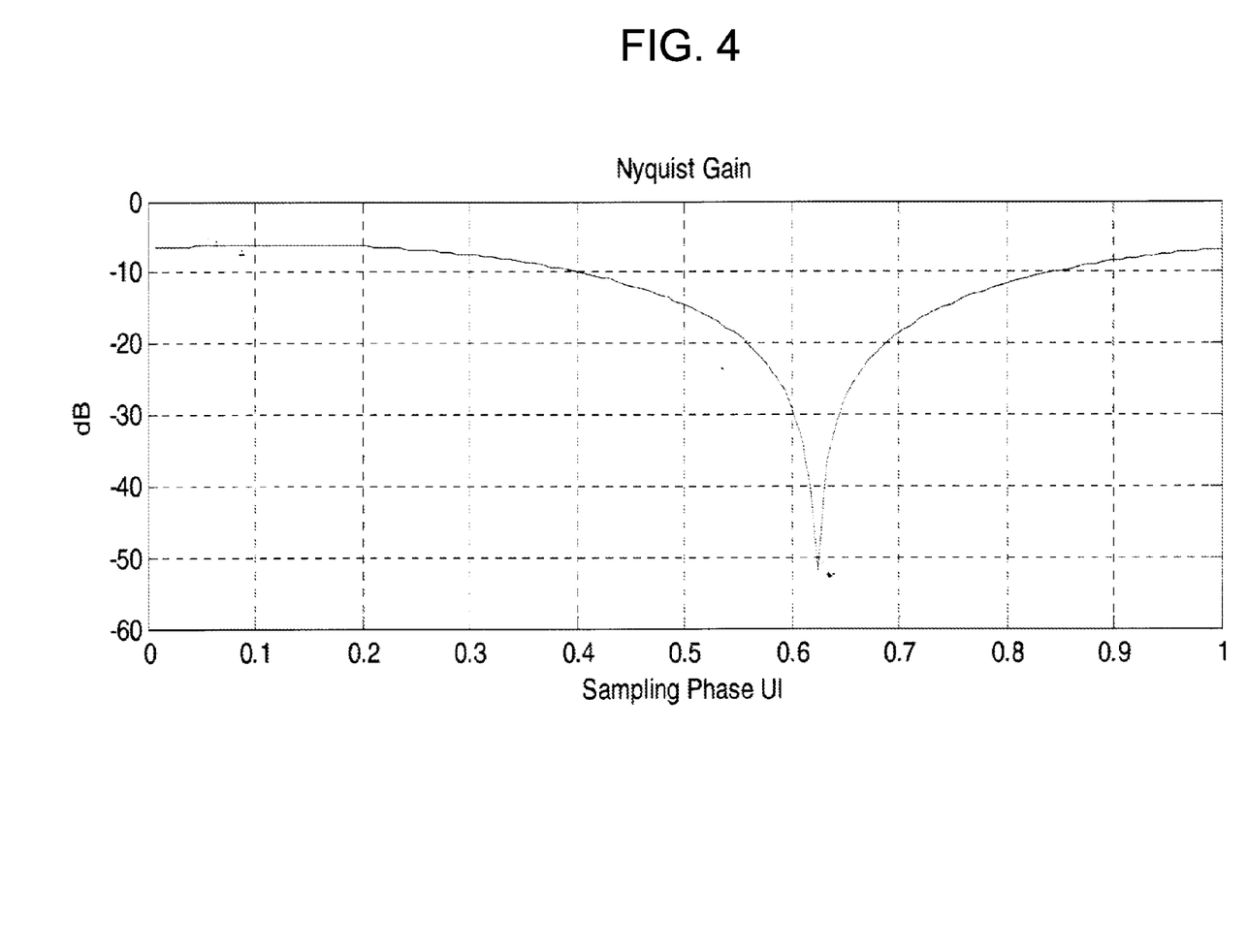
FIG. 4 illustrates a plot of Nyquist gain versus sampling phase over a unit interval.

As shown in FIG. 4, for a given sampling phase unit interval UI, the Nyquist gain associated with a given 10GBASE-T channel exhibits a null within a narrow band of sampling phases. The null characteristic is influenced by aliasing effects at and around the Nyquist frequency (which is 400 MHz for 10GBASE-T). The null characteristic forms a worst-case condition for the channel, which will be of importance in the discussion that follows regarding operation. Identifying the sampling phase for the Nyquist null condition, and providing a sampling offset in the CDRs of FIGS. 3a and 3b, provides a way for calculating THP coefficients to minimize the effects of a worst-case channel environment, as more fully explained below. Estimating the Nyquist gain may be carried out in many ways. For example, one way is to adaptively find the filter that takes the received symbols and creates the ADC samples. The Nyquist gain is then proportional to the sum of the even taps minus the sum of the odd taps of the identified filter.

Figure 5:
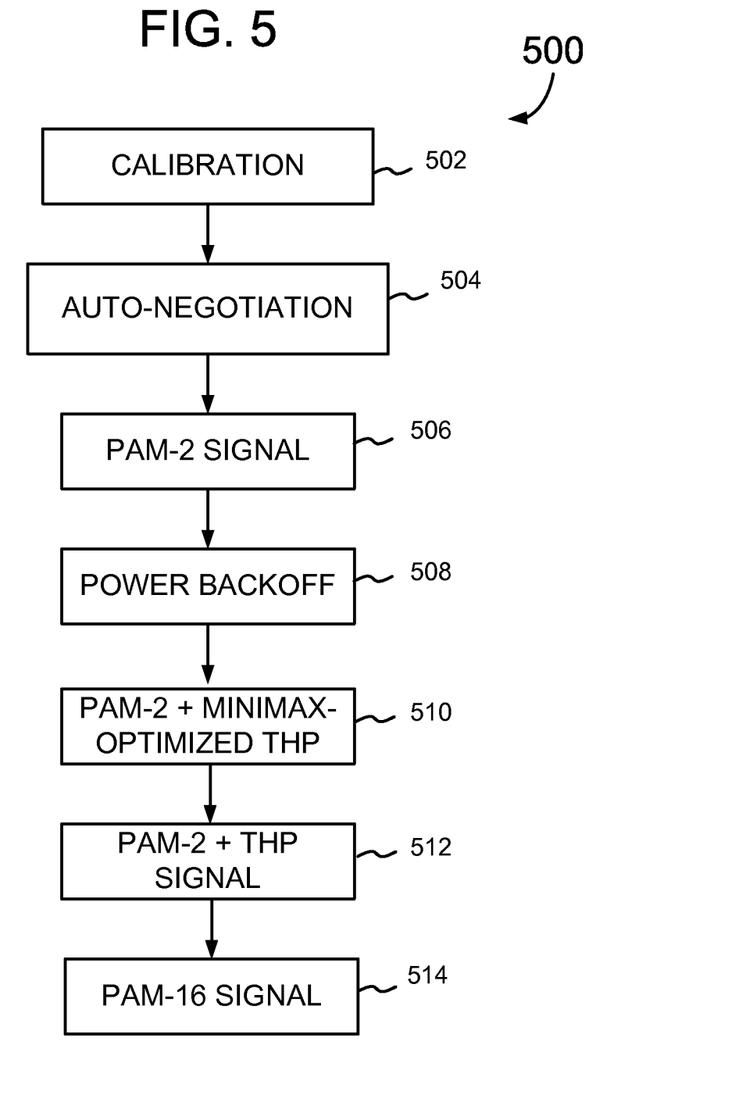
FIG. 5 is a flow diagram illustrating a method of training a 10GBASE-T link.

FIG. 5 is a diagrammatic illustration of an example of a training sequence 500 used to train the parameters of a transceiver to achieve the fully-functional nominal operation of data communication over a communication link. The nominal operation is a predefined level of operation at which parameters are at a particular target level (such as bit error rate being under a particular target rate), and for which the transceiver can transmit and receive data over the link. The training sequence 500 is a predefined sequence of steps known by the link partners, although the boundaries of the steps may be overlapped in some embodiments. The sequence typically occurs at a predefined point of operation, such as at startup or initialization, when a transceiver is powered on or is first connected to a communication link. During nominal operation, after a training sequence, the transceiver continues to adapt parameters to changing characteristics of the link based on received data. However, some characteristics change so quickly that the receiver cannot adapt quickly enough, due to noise, interference, or other disturbances, which sometimes cause the loss of the link. In existing standards, the training sequence is used to re-train transceiver parameters when a transceiver loses a communication link and thereby re-establish the communication link. The training sequence example of FIG. 5 is an example pertinent to the 10GBASE-T communication standard, but other training sequences can be used in other embodiments.

The training sequence 500 can optionally first include a calibration step 502. This step is typically not mandated as part of a communication standard, but is often beneficial to allow the transceiver components to operate optimally. For example, the calibration 502 can include calibration of AFE components of the transceiver such as a DAC, line driver, low pass filter, gain stage, and A/D. In some embodiments, one or more calibration steps may occur during parts or all of the training or re-training sequence.

Following the optional calibration step 502, an auto-negotiation step 504 occurs. The auto-negotiation involves link partners communicating across the communication link to establish common conditions under which normal data communication occurs. For example, the auto-negotiation can include determining which communication standard to use (Ethernet 100Base-T, 10GBASE-T, etc.), and determining which of the link partners will be the Master and which one will be the Slave (the Slave recovers timing information from the Master needed for communication). The auto-negotiation process may incur a processing time on the order of seconds.

Further referring to FIG. 5, after the auto-negotiation step 504, a pulse amplitude modulation-2 (PAM-2) training signal transmission occurs, at step 506. PAM-2 signal transmissions are well known, having two levels of signal to transmit. Further, since the levels are further apart than in a modulation scheme having a greater number of levels, PAM-2 is easier to decode and to detect in a noisy signaling environment, such as training during which residual echo, training and inter-symbol interference may not be minimal yet. During training, the PAM-2 signals sent may be used to determine a transmitter gain and associated setting for a power backoff step (described below), among other functions. Similarly, during this step, the receiver gain may be determined so that the receiver gain can be updated and adapted. In other embodiments, other modulations or formats of signals may be used for training signals as appropriate.

Following transmission of the PAM-2 signal, a power backoff step occurs, at step 508. In this step, the power level used for transmission is reduced down to the minimum level needed for communication (e.g. a shorter cable length may require less power), thus saving power during operation and reducing noise such as crosstalk to and from adjacent transceiver communication ports. For example, the link partners negotiate a power backoff level by exchanging information indicating the required power that the other link partner needs and settling on a level. The transceiver adjusts the transmitter gain to the determined level to back off the power level for transmission. The transceiver also can adjust the receiver gain in this step based on the path of the entire channel of transmission/reception, where the receiver gain for more optimal operation can be determined in the prior PAM-2 transmission step, at 506. The receiver gain can also be adjusted at one or more later times during other stages after this step.

During the PAM-2 transmissions and power backoff steps 506 and 508, updating and adaptation of the various filters and equalizers can be performed, as well as clock and timing recovery. For example, the updating of filters including echo cancellers, NEXT cancellers, FEXT cancellers, and equalizers in the receiver can be performed based on the training signal provided during these training stages. The clock and timing recovery can also be performed by the Slave transceiver during all or most stages of the training sequence to synchronize with the Master. For example, the clock frequency and the clock phase can be adjusted at the Slave to be synchronized to the Master during the clock recovery, by adjusting the frequency offset and the phase offset between Master and Slave to compensate for any drift in frequency and phase. The frequency offset and phase offset adjustment, for example, can be performed continuously (or approximately continuously) throughout the training sequence, e.g. steps 506 and 508.

After the power backoff step 508, a PAM-2 training signal is again transmitted, at step 510. In addition to the filter and equalizer adapting, clock and timing recovery, and any other adjusting, the coefficients for the THP precoder in the link partner transmitter are also determined. For example, in 10GBASE-T, the coefficients for Tomlinson-Harashima precoding (THP) are determined for the link partner transmitter. Furthermore, the determined THP coefficients are exchanged by the link partners so that each transceiver has the appropriate precoder coefficients as determined by its link partner, and the receiver is synchronized with the transmitter that is now using the precoding.

There are many methods in finding the right THP coefficients. For instance, they can be determined by inverting the PSD of the received signal, or they can be determined through minimum mean square approach that results in a minimum cost function. This cost function can be the power of noise and residual inter-symbol interference (ISI). There are many flavors of minimum mean square method, Least Mean Square (LMS) is one of them. Another approach that is described herein is called the minimax approach. At a high-level, determining the THP coefficients in step 510 involves a unique form of mimimax processing, in which the calculated THP coefficients are selected to minimize the worst-case channel conditions.

Figure 6:
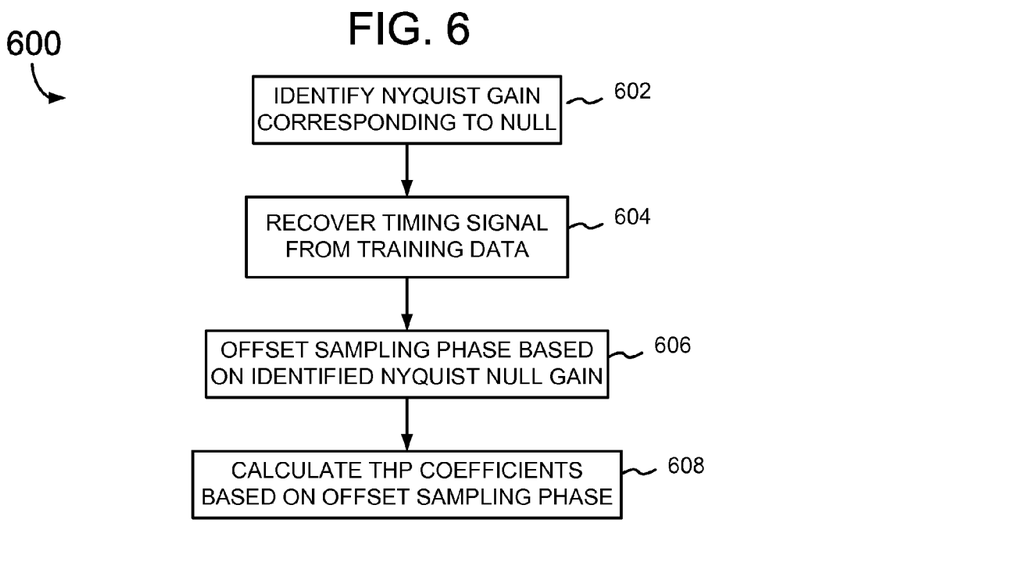
FIG. 6 is a flow diagram of a more detailed embodiment of determining THP coefficients in the flow diagram of FIG. 5.

For the hardware embodiments set forth in FIGS. 1, 2, 3a and 3b, further detail regarding one embodiment of determining the THP coefficients at step 510 involves identifying minimax coefficients that correspond to the worst sampling phase that causes the Nyquist gain null exhibited in FIG. 4. FIG. 6 provides further detailed steps relating to this embodiment, first including identifying the Nyquist channel gain at step 602. This gain is zero (or very small) for the worst sampling phase that yields null at Nyquist frequency. Timing information associated with the received data singles is extracted from the data in accordance with a straightforward CDR recovery step, in 604. The sampling phase recovered from the data is then offset by a value proportional to the identified Nyquist gain value, at step 606. The feedback control loop (308) adjusts the sampling such that its input converges to zero. The optimal feedforward equalizer guarantees a zero output of the phase detector (304) for all sampling phases. Consequently, the control loop drives the phase such that the offset due to Nyquist gain also converges to zero yielding the worst sampling phase. The resulting samples are then evaluated and optimal THP coefficients calculated, at step 608, and passed back to the transmitter where they are then used as the transmit equalizer tap values for future data transmissions. These THP coefficients are the optimal coefficients for the worst sampling condition. With this minimax approach, the THP coefficients result in best performance for the worst case scenario.

Returning to the flow-diagram of FIG. 5, following the minimax THP coefficient generation and communication described above, a subsequent PAM-2 training signal is transmitted, at step 512,—this time with the calculated THP precoding using the coefficients and other parameters determined in step 510. The precoding applied to the subsequent PAM-2 signal allows the far-end receiver to retune its filters for the potential difference between optimal operating points with and without the precoding, so that the same adaptation can be used during normal transmission (since THP is sent by the transmitter, it is not adapted during normal data reception by the receiver). Note that after the THP coefficients are calculated there is no need to force the worst sampling phase. In fact, there is it is possible to shift the sampling phase by 180 degrees so that it is close to the optimal sampling phase. This involves some filters (other than the THP) to be re-trained again. The minimax algorithm described above provides the best performance for the worst case scenario.

Finally, at step 514, a PAM-16 type of signal or similar signal (such as a signal having greater levels than PAM-2) is transmitted as a training signal (including training data), which allows receiver parameter adaptation to be performed with a signal that has the same characteristics as the signal used during nominal operation. For example, DSQ128 type of modulation is provided in 10GBASE-T, and so the training signal for step 514 is DSQ128. After sending the PAM-16 training signal for an appropriate time to adapt the filters, equalizers, timing, and other components, the training sequence ends and a normal operation mode initiated, in which actual data is transmitted and received by the transceiver as PAM-16 signals.

Figure 7:
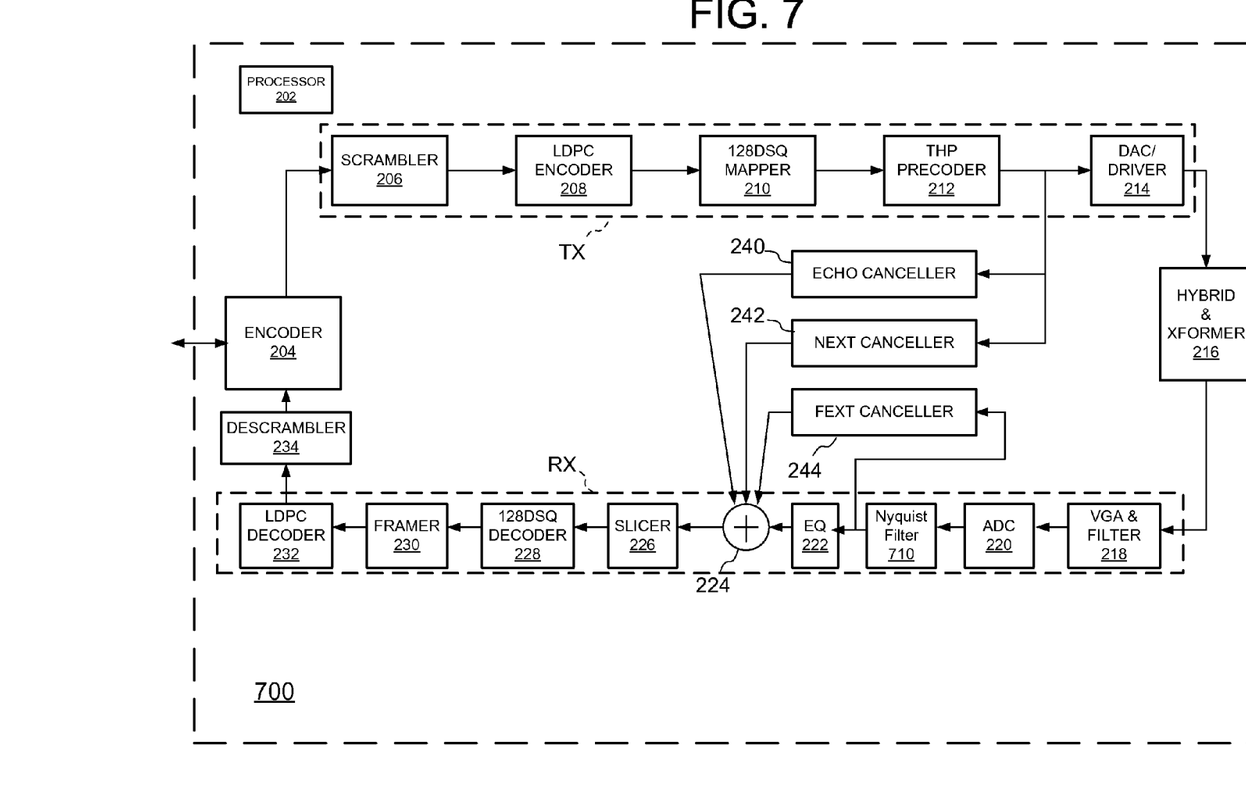
FIG. 7 is a further embodiment of a transceiver circuit similar to FIG. 2.

FIG. 7 illustrates a further embodiment of a transceiver circuit, generally designated 700, that employs much of the circuitry identified and described above relating to the transceiver 200 of FIG. 2. For purposes of brevity, a repetitive discussion of many of the structures common to both embodiments will be omitted. At a high-level, rather than employ a sampling offset circuit in the ADC 220, the embodiment of FIG. 7 provides an additional filter in the receive path for selective use during training, and configured to filter the data in accordance with a predefined channel characteristic consistent with the Nyquist null condition described above.

Further referring to FIG. 7, there is an additional filter 710 that creates a null at the Nyquist frequency, similar to what the aliasing effect would cause at the worst sampling phase. Because of the Nyquist null filtering, the generated THP coefficients will correspond to such a condition, and thus minimize the effects of the worst-case channel condition. Once these THP coefficients are calculated, the Nyquist filter 710 is not needed anymore and can be bypassed from the receive path. The feedforward equalizer (FFE) 222 is then retrained after this filter is removed. Alternatively, the effect of the Nyquist filter can be combined with FFE by convolving the impulse response of the Nyquist filter with that of the original FFE.

Figure 8:
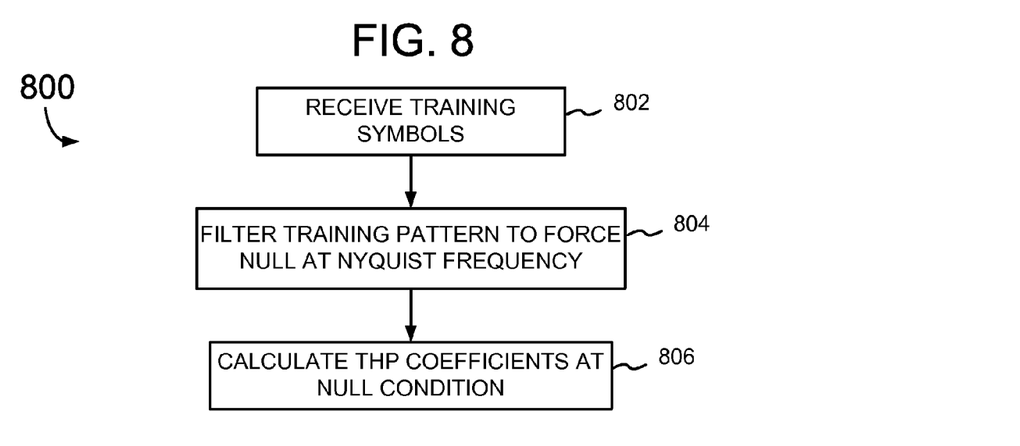
FIG. 8 is a flow diagram of a further detailed embodiment of determining THP coefficients similar to the flow diagram of FIG. 6.

FIG. 8 specifies the detailed THP generation steps as an alternative to those specified in FIG. 6 for the THP minimax generation step 510 (FIG. 5). The steps involve receiving training symbols, at 802, and filtering the received training pattern to force a null at the Nyquist frequency, at step 804. The THP coefficients are then calculated based on the filtered null condition, at step 806.

In another embodiment, the effect of the Nyquist filter is applied as a post-processing step. In this embodiment, the THP coefficients are first determined using the usual optimization algorithms (Spectrum matching, MMSE, LMS, etc). Once these coefficients are determined, the effect of the Nyquist filter is combined with the THP coefficients in a post-processing step. This can be done by convolving the Nyquist filter with feedback path of THP filter (including the implicit first unity tap). This will create the required response in THP to compensate for the null in the worst sampling phase. Similar to the previous embodiment, the same Nyquist filter can also be convolved into FFE coefficients so that to maintain the joint-optimality of THP and FFE.

Figure 9:
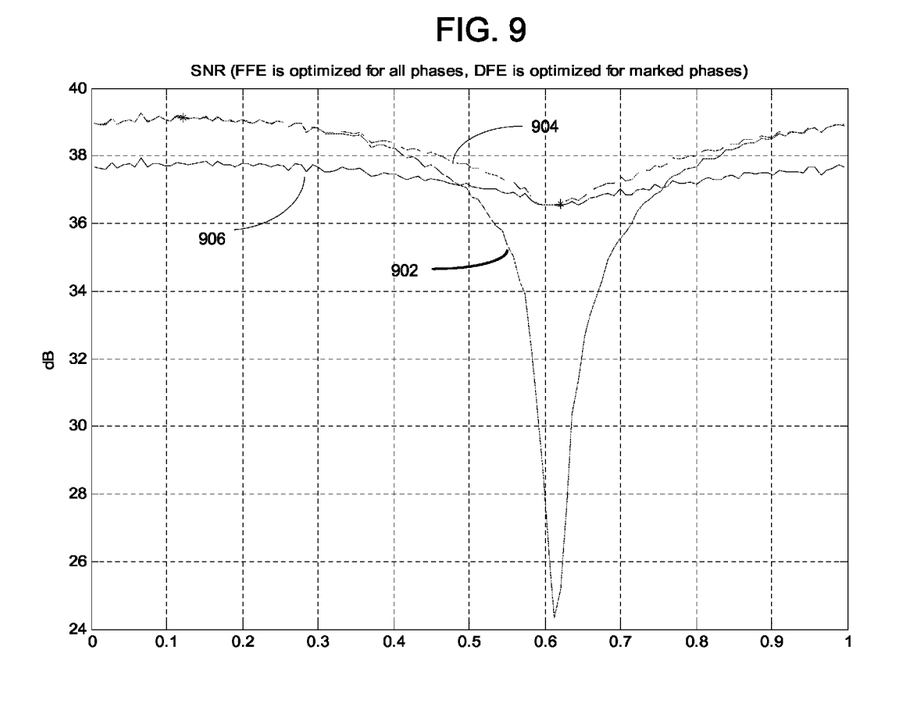
FIG. 9 illustrates an overlayed plot of a plurality of signal-to-noise (SNR) ratios versus sampling phase.

Those skilled in the art will appreciate the benefits and advantages afforded by the Minimax THP determination methods described above. FIG. 9 provides an overlay graph showing SNR as a function of sweeping sampling phase over a unit interval in accordance with (i) a conventional fixed THP generation scheme, at 902, (ii) an adaptively changing THP updating scheme at 904 (not supported by the current 10GBASE-T specification), and (iii) the Minimax THP generation method that minimizes the effects of a worst-case channel condition, at 906. By minimizing the effects of a worst-case channel condition with THP coefficients that are fixed at the transmitter, a Nyquist gain null from slight changes in sampling phase (and resulting aliasing effects) can be avoided with only a minor reduction in SNR. This is especially important for 10GBASE-T applications due to the cable lengths that may experience temperature changes and other environmental conditions that might affect the channel parameters.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation in a receive circuit, the method comprising: entering an initialization mode; receiving training data from along a lossy signaling path, the training data originating from a transmit circuit; sampling the received training data, the sampling including determining a minimax sampling phase that is offset from an optimal sampling phase by an offset value, sampling the received data utilizing the minimax sampling phase; generating minimax transmit equalizer coefficients based on the sampled receive data utilizing the sub-optimal sampling phase; transmitting the minimax transmit equalizer coefficients back to the transmit circuit; exiting the initialization mode; and in an operating mode, receiving transmit data precoded by the minimax transmit equalizer coefficients.

2. The method according to claim 1 wherein the transmit equalizer coefficients comprise Tomlinson-Harashima Precoder (THP) coefficients.

3. The method according to claim 1 wherein the minimax sampling phase corresponds to a worst-case sampling condition.

4. The method according to claim 3 wherein the worst-case sampling condition correlates to a Nyquist gain null.

5. The method according to claim 2 wherein the generating minimax THP coefficients comprises:
   filtering the sampled training data in accordance with a predefined channel characteristic; and
   generating sub-optimal transmit equalizer coefficients based on the filtered data.

6. The method according to claim 2 wherein the generating minimax THP coefficients comprises:
   generating optimal THP coefficients based on the sampled training pattern; and
   in a post-processing step, changing the generated THP coefficients based on a predefined Nyquist null response characteristic.

7. A 10GBASE-T receiver circuit comprising: sampling circuitry to, in a training mode, receive training data from a first integrated circuit, the sampling circuitry including a sampling offset circuit to apply an offset to a sampling phase for the receive data from an optimal sampling phase to a sub-optimal sampling phase; a processor to calculate minimax transmit equalizer coefficients based on a minimax algorithm; and transmit circuitry to communicate the minimax transmit equalizer coefficients back to the first integrated circuit.

8. The 10GBASE-T receiver circuit according to claim 7 and further including:
   filtering circuitry coupled to the sampling circuitry to filter the sampled training pattern in accordance with a predefined channel characteristic; and
   wherein the processor receives the filtered training pattern to calculate the minimax THP coefficients.

9. The 10GBASE-T receiver circuit according to claim 7 wherein the processing circuitry further includes:
   post-processing circuitry to change a set of optimal THP coefficients to the minimax coefficients based on a Nyquist null response characteristic.

10. A receiver integrated circuit comprising:
    a first sampling circuit responsive to a first timing signal to sample an input data signal;
    a second sampling circuit disposed in parallel with the first sampling circuit and responsive to a second timing signal to sample the data signal, the first and second timing signals having a fixed offset phase relationship;
    a control loop to adjust the first and second timing signals, the control loop including a phase offset input based on a Nyquist gain associated with one or both of the sampling circuits;
    wherein the control loop drives the Nyquist gain value to a null to correspondingly set the second timing signal to a worst-case timing value, and correspondingly drive the first timing signal by the fixed offset phase relationship to the second timing signal.

11. The receiver integrated circuit according to claim 10 wherein the first and second sampling circuits form respective analog-to-digital converters.

12. The receiver integrated circuit according to claim 10 wherein the fixed offset relationship is 180 degrees.

13. The receiver integrated circuit according to claim 10 embodied as a 10GBASE-T transceiver integrated circuit.

14. The receiver integrated circuit according to claim 10 wherein the control loop includes a phase detector coupled to a phase controller via a summing circuit, the summing circuit including an input to receive the phase offset value based on the Nyquist gain of the second sampling circuit.

15. The receiver integrated circuit according to claim 10 wherein the offset based on a Nyquist gain value is a value proportional to the Nyquist gain of the second sampling circuit, and the fixed timing offset relationship is 180 degrees.

16. The receiver integrated circuit according to claim 10 wherein the offset based on a Nyquist gain value is a value proportional to a difference between respective Nyquist gains associated with the respective first and second sampling circuits, and the fixed timing offset relationship is less than 90 degrees.

17. The receiver integrated circuit of claim 10 wherein the control loop drives the derivative of the Nyquist gain to zero which enforces the optimal sampling phase.

* * * * *